(12) United States Patent
Thottakkara et al.

(10) Patent No.: US 7,969,915 B2
(45) Date of Patent: Jun. 28, 2011

(54) TECHNICAL ENHANCEMENTS TO STP (IEEE 802.1D) IMPLEMENTATION

(75) Inventors: Benny J. Thottakkara, San Jose, CA (US); Rajiv Ramanathan, Cupertino, CA (US)

(73) Assignee: Foundry Networks, LLC, San Jose, CA (US)

( * ) Notice: Subject to any disclaimer, the term of this patent is extended or adjusted under 35 U.S.C. 154(b) by 110 days.

(21) Appl. No.: 12/509,313

(22) Filed: Jul. 24, 2009

(65) Prior Publication Data

US 2010/0061254 A1    Mar. 11, 2010

Related U.S. Application Data

(63) Continuation of application No. 10/394,344, filed on Mar. 20, 2003, now Pat. No. 7,586,856.

(51) Int. Cl.
*H04L 12/28* (2006.01)
(52) U.S. Cl. .................. 370/256; 370/244; 370/255
(58) Field of Classification Search ............. 370/244, 370/255, 256
See application file for complete search history.

(56) References Cited

U.S. PATENT DOCUMENTS

| | | |
|---|---|---|
| 6,304,575 B1 | 10/2001 | Carroll et al. |
| 6,628,624 B1 | 9/2003 | Mahajan et al. |
| 6,891,808 B2 | 5/2005 | Ishii |
| 7,586,856 B1 * | 9/2009 | Thottakkara et al. ......... 370/256 |
| 2002/0159398 A1 | 10/2002 | Yamada et al. |

OTHER PUBLICATIONS

Office Action issued in U.S. Appl. No. 10/394,344, dated Mar. 27, 2007.
Office Action issued in U.S. Appl. No. 10/394,344, dated Oct. 3, 2007.
Office Action issued in U.S. Appl. No. 10/394,344, dated Apr. 10, 2008.
Office Action issued in U.S. Appl. No. 10/394,344, dated Oct. 8, 2008.
Office Action issued in U.S. Appl. No. 10/394,344, dated Jan. 28, 2009.
Notice of Allowance issued in U.S. Appl. No. 10/394,344, dated Jul. 2, 2009.
IEEE Standard for Local and Metropolitan Area Networks—Common Specification, Part 3: Media Access Control (MAC) Bridges (The Institute of Electrical and Electronics Engineers, Inc., New York, NY 1009).

* cited by examiner

*Primary Examiner* — Jason E Mattis
(74) *Attorney, Agent, or Firm* — Nixon Peabody LLP; John P. Schaub

(57) ABSTRACT

An embodiment includes a method of minimizing the delay in convergence time for a complex STP topology following a topology change in the network system in the spanning tree protocol (STP) standard, including: receiving, by a root port of a first bridge, a data message that includes identification of a current root bridge and a priority value of the current root bridge; receiving, by a second port of the first bridge, a second data message from a second bridge; and if a message age timer of the first bridge has less than a limiting message age time value remaining before expiry, then blocking a reply, by the second port of the first bridge, to the second data message from the second bridge.

24 Claims, 5 Drawing Sheets

TECHNICAL ENHANCEMENTS TO STP (IEEE 802.1D) IMPLEMENTATION

CROSS-REFERENCE TO RELATED APPLICATIONS

This application is a continuation of prior U.S. patent application Ser. No. 10/394,344, entitled "Technical Enhancements To STP (IEEE 802.1D) Implementation," filed on Mar. 20, 2003, now U.S. Pat. No. 7,586,856.

TECHNICAL FIELD

Embodiments of the present invention relate generally to communication networks. More particularly, embodiments of the present invention provide enhancements to the STP (IEEE 802.1D) implementation.

BACKGROUND

The Institute of Electrical and Electronics Engineers (IEEE) 802.1D Spanning-Tree Protocol (STP) standard is a link management protocol and provides distributed routing over multiple Local Area Networks (LANs) that are connected by Media Access Control (MAC) bridges. The 802.1D standard is presented in detail in *IEEE Standard for Local and Metropolitan Area Networks—Common Specification, Part 3: Media Access Control (MAC) Bridges* (The Institute of Electrical and Electronics Engineers, Inc., New York, N.Y. 1998), which is hereby fully incorporated herein by reference.

The STP protocol provides path redundancy, while preventing undesirable loops in a network that are created by multiple active paths between bridges. Loops occur when there are alternate routes between hosts. To establish path redundancy, STP creates a tree that spans all of the bridges in an extended network, forcing redundant paths into a standby, or blocked, state. STP allows only one active path at a time between any two network devices (this prevents the loops), but establishes the redundant links as a backup path if the initial link should fail. If STP costs change, or if one network segment in the STP becomes unreachable, then STP reconfigures the spanning tree topology and reestablishes the link by activating the standby path. Without the spanning tree in place, it is possible that both connections may be simultaneously live, which could result in an endless loop of traffic on the Local Area Network(LAN).

For any network topology changes, the convergence time in the STP (IEEE 802.1D) standard is usually about 50 seconds (i.e., two times the forward delay plus a maximum age time).

However, there is a need for further enhancements and optimizations to the implementation of the STP (IEEE 802.1D) standard.

SUMMARY OF EMBODIMENTS OF THE INVENTION

In one embodiment of the invention, a method of performing root port selection computation in the spanning tree protocol (STP) standard, includes:
determining if a port is in a loopback connection in a bridge; and
excluding the port from the root port selection computation if the port is in a loopback connection.

In another embodiment of the invention, a method of placing a port in a forwarding state in the spanning tree protocol (STP) standard, includes:
initially placing a port in fast span configuration;
if no BPDU is detected by the port, then maintaining the fast span configuration; and
shortening the forward delay if the port is maintained in the fast span configuration.

In another embodiment of the invention a method of minimizing the delay in convergence time for a complex STP topology following a topology change in the network system in the spanning tree protocol (STP) standard, includes:
receiving, by a root port of a first bridge, a data message that includes identification of a current root bridge and a priority value of the current root bridge;
receiving, by a second port of the first bridge, a second data message from a second bridge; and
if a message age timer of the first bridge has less than a limiting message age time value remaining before expiry, then blocking a reply, by the second port of the first bridge, to the second data message from the second bridge.

In another embodiment, an apparatus for performing root port selection computation in the spanning tree protocol (STP) standard, includes:
a bridge including an STP module and an enhancement module;
the STP module configured to perform processing functions of the STP protocol; and
the enhancement module configured to determine if a port is in a loopback connection in the bridge, and exclude the port from the root port selection computation if the port is in a loopback connection.

In yet another embodiment, an apparatus for placing a port in a forwarding state in the spanning tree protocol (STP) standard, includes:
a bridge including an STP module and an enhancement module;
the STP module configured to perform processing functions of the STP protocol;
the enhancement module configured to initially place a port in fast span configuration;
the enhancement module configured to maintaining the fast span configuration, if no BPDU is detected by the port; and
the enhancement module configured to shorten a forward delay if the port is maintained in the fast span configuration.

In yet another embodiment, an apparatus for minimizing the delay in convergence time for a complex STP topology following a topology change in the network system in the spanning tree protocol (STP) standard, the apparatus comprising:
a bridge including an STP module and an enhancement module;
the STP module configured to perform processing functions of the STP protocol;
the bridge configured to receive a data message that includes identification of a current root bridge and a priority value of a current root bridge;
the bridge configured to receive a second data message from a second bridge; and
the bridge configured to block a reply to the second data message from the second bridge, if a message age timer of the bridge has less than a limiting message age time value remaining before expiry.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1:
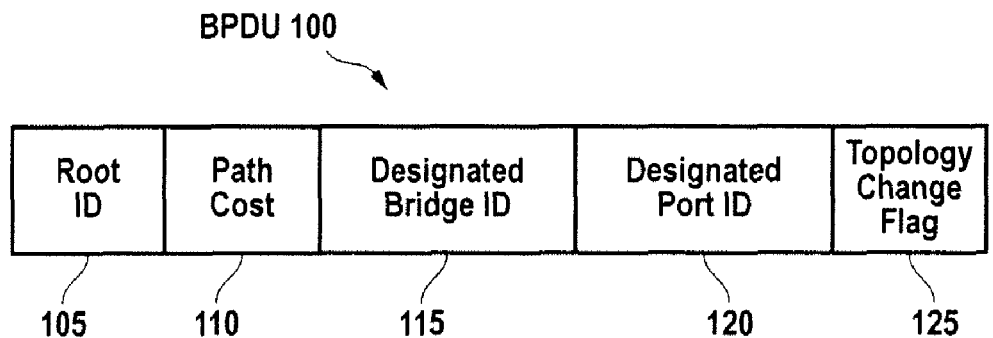
FIG. 1 is a block diagram of a bridge protocol data unit (BPDU) used in accordance with an embodiment of the invention.

FIG. 1 is a block diagram of a bridge protocol data unit (BPDU) 100 used in accordance with an embodiment of the invention. BPDUs are data messages that are exchanged across the switches within an extended local area network (LAN) that uses a spanning tree protocol topology. BPDU packets contain information on, for example, ports, addresses, priorities and costs and ensure that the data ends up where the data was intended to go. BPDU messages are exchanged across bridges to detect loops in a network topology. The loops are then removed by shutting down selected bridge interfaces and placing redundant switch ports in a backup, or blocked, state.

In an embodiment, a BPDU 100 typically includes the following fields 105 to 120: a root identification (ID) 105 which contains the same information as the bridge ID (identifier) in the following format {bridge priority: lowest MAC address}, a path cost 110, a designated bridge ID 115, and a designated port ID 120. To determine the more useful (or superior) BPDU between two particular different BPDUs, the BPDU values in FIG. 1 are compared by a bridge that receives the BPDU. The BPDU with the numerically lower value is selected as the more useful BPDU.

Figure 2:
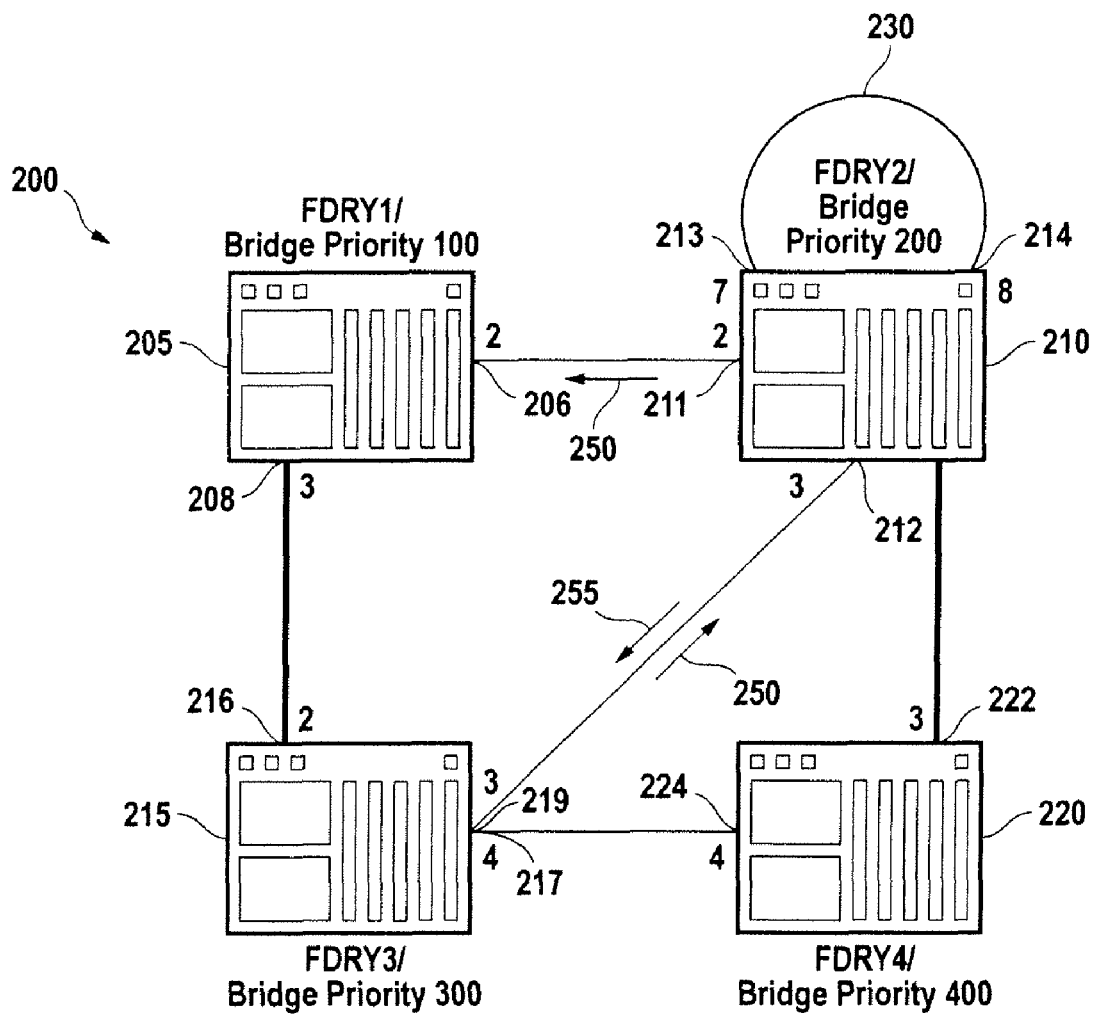
FIG. 2 is a block diagram of a STP topology to explain port roles in the bridges (or switches) in a network system 200.

FIG. 2 is a block diagram of a STP topology to explain port roles in the bridges (or switches) in a network system 200. The system 200 includes bridges FDRY1 205, FDRY2, 210, FDRY3 215, and FDRY4 220. Each of the bridges transmits a BPDU to identify itself to other bridges in the system 200. When a bridge receives a BPDU, the bridge will compare the received BPDU with a BPDU that can be sent by the bridge to determine which BPDU is more useful. As mentioned above, the BPDU with the numerically lower value is selected as the more useful BPDU.

A "root bridge" sends BPDUs that are more useful than BPDUs that any other bridge can send. The root bridge is the only bridge in the network that does not have a root port. All other bridges receive BPDUs on at least one port.

In the example of FIG. 2, bridge FDRY1 205 is selected as the root bridge because the bridge priority value (value=100) of bridge FDRY1 205 is numerically lower than the bridge priority value of each of the bridge FDRY2 210, bridge FDRY3 215, and bridge FDRY4 220. Since bridge FDRY1 205 has a port 2 (206) and a port 3 (208) connected to bridge FDRY2 210 and bridge FDRY3 215, respectively, the ports on bridge FDRY1 205 will be in a forwarding state, in the absence of a loopback connection between two ports in the bridge FDRY1 205.

A port is a "designated port" if it can send the best (most useful) BPDU on the segment to which it is connected. The IEEE 802.1D bridges create a bridge domain by linking together different segments such as, for example, Ethernet segments. On a given segment, there can only be one path toward the root bridge. If there were two paths, then there would be a bridging loop in the network. All bridges connected to a given segment listen to each other's BPDUs and agree on the bridge sending the best BPDU as the designated bridge for the segment. The corresponding port on that bridge is a designated port. In the example of FIG. 2, the designated ports are shown as ports 206 and 208 on the root bridge FDRY1 205. Thus, the ports 206 and 208 are in the forwarding state.

The port receiving the best Bridge Protocol Data Unit (BPDU) on a bridge is a "root port". This is the port that is closest to the root bridge in terms of path cost. In the example of FIG. 2, a port 211 on the bridge FDRY2 210 is selected as a root port 211, since the port 211 is connected to the root bridge FDRY1 205. A port 216 on the bridge FDRY3 215 is selected as a root port 216, since the port 216 is connected to the root bridge FDRY1 205.

Bridge FDRY4 220 will receive more useful BPDUs at port 3 (222) and port 4 (224) than the BPDUs that the bridge FDRY4 220 can send out. The reason for this is because the bridge FDRY4 220 has a priority value of 400, which is a numerically higher value than each of the priority values in the other bridges FDRY1 205, FDRY2 210, and FDRY3 215. In other words, bridge FDRY4 220 has the least priority in the system 200.

A "blocked port" is defined as not being the designated port or the root port. A blocked port receives a more useful BPDU than the BPDU it would send out on its segment. An "alternate port" is a port blocked by receiving more useful BPDUs from another bridge.

It is noted that bridge FDRY2 210 has a lower bridge priority value (value=200) than the bridge priority value of bridge FDRY3 215 (value=300). Therefore, bridge FDRY2 210 can transmit a more useful BPDU 100 than the BPDU that can be transmitted by the bridge FYFDRY3 215. Therefore, port 3 (222) on bridge FDRY4 220 will be assigned the role of root port in a forwarding state. Since port 4 (224) on bridge FDRY4 220 receives more useful BPDUs 100 than the BPDUs 100 that can be transmitted by the bridge FDRY4 220, port 4 (224) will assume the role of a blocked port or an alternate port.

Port 4 (217) on bridge FDRY3 215 is connected to the alternate port 224 on bridge FDRY4 220. Therefore, port 4 (217) on bridge FDRY3 215 assumes the role of a designated port and will be in a forwarding state.

The roles of port 3 (219) on bridge FDRY3 215 and port 3 on bridge FDRY2 210 are established based on the following discussion. It is noted that bridge FDRY2 210 has a lower bridge priority value (value=200) than the bridge priority value of bridge FDRY3 215 (value=300). Therefore, bridge FDRY2 210 can transmit a more useful BPDU 100 than the BPDU that can be transmitted by bridge FDRY3 215. In other words, the BPDU that is received by bridge FDRY3 215 on port 3 (219) will be more useful than the BPDU that can be transmitted by port 3 (219) on bridge FDRY3 215. However, since port 2 (216) on bridge FDRY3 215 has already been established as a root port, the port 3 (219) will assume the role of a blocked port. Port 3 (212) on bridge FDRY2 (210) is a designated port and will go into a forwarding state.

Port 7 (213) and port 8 (214) on bridge FDRY2 210 form a loopback connection 230. The blocking port and the forwarding port is determined based on the following. The designated port ID 120 (FIG. 1) is a union of port priority value and port number {port priority:port number}. The port priority value for BPDUs 100 sent from each of the port 7 (213) and port 8 (214) is value=200. Thus, the port number will determine if the BPDU from port 7 (213) or from the BPDU from port 8 (214) is more useful. Since port 7 (213) is numerically lower than port 8 (214), port 7 (213) sends the more useful BPDU 100. Therefore, port 7 (213) will assume the role of designated port in a forwarding state, and port 8 (214) will assume the role of blocked port.

It is noted that two instances of expiry of a single timer (forward delay timer) changes the state of a designated port. After a first timer expiry event occurs, a designated port will change state from a "listening state" to a "learning state. A particular port in a listening state is defined as a state where the bridge listens to BPDUs on the particular port. A particular port in a learning state is defined as a state where the particular port can learn about MAC (Media Access Control) flows, but the particular port is prohibited from forwarding the MAC flows. A MAC flow is defined as any network traffic that is in a Layer 2 flow.

After the second timer expiry, the designated port will change state from a "learning state" to a "forwarding state". A particular port in a forwarding state is defined as a state where the bridge can listen, learn, or forward data traffic on the particular port. This is the same method used by STP to make a root port into forwarding state.

As an example, assume that port 2 (216) on bridge FDRY3 215 fails, where this port 2 (216) has the role of a root port as discussed above. In this failure condition, it can be assumed that a valid connection no longer exists between port 3 (208) on bridge FDRY1 205 and port 2 (216) on bridge FDRY3.

If an alternate port exists on the bridge FDRY3 215, then the alternate port will assume the role of root port. In the example of FIG. 2, port 3 (219) on bridge FDRY3 215 has the role of alternate port, as discussed above. Therefore, the role of port 3 (219) will change from an alternate port to a root port, when the root port 2 (216) fails. Since the port 3 (219) has changed to a root port, the port 3 (219) will change into a forwarding state. As similarly mentioned, two timer expiry events will occur before the new root port 3 (219) goes into the forwarding state.

Since the root port of bridge FDRY3 215 has changed from port 2 (216) to port 3 (219), a topology change event has occurred in the system 200. Therefore, the new root port (i.e., port 3 (219) in this example) transmits a topology change notification (TCN) packet 250 to its connected designated port (i.e., port 3 (212) in bridge FDRY2 210 in this example). The TCN packet 250 has the purpose of propagating the topology change information across the entire system 200. When the designated port 3 (212) receives the TCN packet 250, the port 3 (212) acknowledges the receipt of the TCN packet 250 by replying with a TCN-ACK BPDU packet 255 to the port 3 (219) which had sent the TCN packet 250, so that the sender of the TCN packet 250 can stop transmitting the TCN packet 250. This TCN-ACK BPDU packet helps to avoid the transmission of duplicate TCNs packets 250. Typically, the TCN-ACK BPDU packet is a BPDU 100 with a TC-ACK bit set.

In order to propagate the topology change in the system 200, the bridge FDRY2 210 will forward the received TCN packet 250 through its root port (i.e., port 2 (211) in the example of FIG. 2). Therefore, the root bridge FDRY1 205 will receive the TCN packet 250. The root bridge FDRY1 205 then sets a topology change flag 125 in its outgoing BPDUs 100 to indicate that all bridges in the system 200 should flush their MAC tables because of the topology change event. When other bridges in the system 200 receives the BPDU 100 with the set topology change flag 125, the other bridges will set the topology change flag 125 in their outgoing BPDUs 100 that are transmitted from their designated ports.

When convergence has been achieved in the system 200, all of the designated ports can transmit the BPDUs 100 and the blocked ports and roots ports do not transmit the BPDUs 100.

Figure 3:
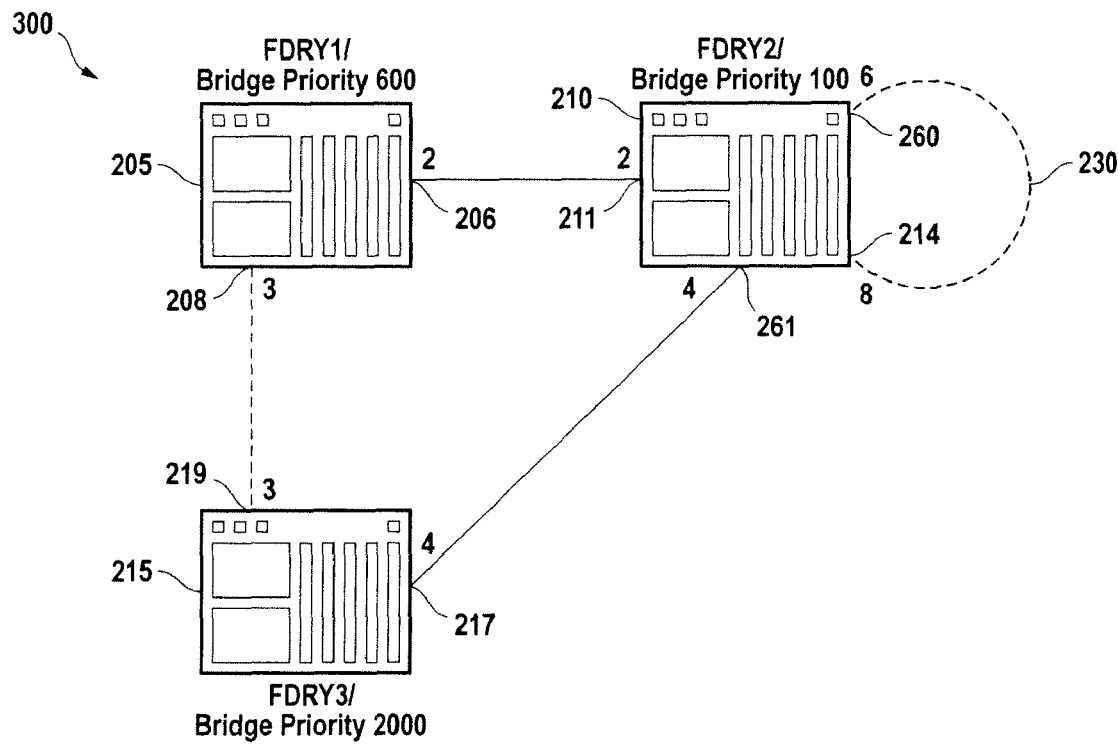
FIG. 3 is a block diagram of a network system 300 which illustrate a method of performing a root port selection when a logical loopback is present in a bridge, in accordance with an embodiment of the invention.

FIG. 3 is a block diagram of a network system 300 which illustrate a method of performing a root port selection when a logical loopback is present in a bridge, in accordance with an embodiment of the invention. As discussed above, the STP standard explicitly assigns a unique role for each port in a bridge. The STP BPDUs 100 transmitted from any port will be as per the role assigned to the port by the STP algorithm. Enhancement 1

It is noted that in the STP standard, when an STP bridge is the root bridge, the bridge selects a backup port errantly as a root port when the bridge priority is changed. A method in accordance with an embodiment of the invention advantageously eliminates this problem for ports in a loopback connection.

In the example of FIG. 3, the system 300 includes the bridge FDRY1 205 with bridge priority value equal to 600, bridge FDRY2 210 with bridge priority value equal to 100, and bridge FDRY3 215 with bridge priority value equal to 2000. Also, in system 300, the STP forwarding path has converged, and port 6 (260) on bridge FDRY2 210 is a designated port and port 8 (214) on bridge FDRY2 210 is an alternate port.

Assume in this example that the priority of bridge FDRY2 210 is changed (e.g., by an administrator) from the value of 100 to a value of 3000, so that the bridge FDRY2 210 now has the least priority among the bridges in system 300. Due to an error in root selection ( ) algorithm in the STP standard, port 8 (214) will be selected as a root port on bridge FDRY2 210 to correspond to the old bridge priority value (of bridge FDRY2 210) which is value 100. This causes STP to take additional 20 seconds so that the message age timer on FDRY2 will be able to expire. Each bridge maintains a timer for its non-designated ports. This timer is referred to as the message age timer. The message age timer will not be active for a designated port.

In the example of FIG. 3, port 8 (214) is physically loop backed to port 6 (260), via loopback connection 230. Initially, when the bridge FDRY2 210 has a bridge priority value of 100, port 2 (211) and port 4 (261) are in the forwarding state, while port 6 (260) is in a forwarding and port 8 (214) is in a blocked state.

A method to identify a loopback connection is described below with reference to FIG. 4.

In the steady state, port 8 (214) has stored values indicating that the bridge priority value of bridge FDRY2 210 is at value=100. Now assume, for example, that an administrator changes the bridge priority value of bridge FDRY2 210 to a value=3000. Since the port 8 (214) still stores the former bridge priority value of 100, the STP root port selection algorithm will select port 8 (214) as the new root port for the bridge FDRY2 210. However, in this example, when the bridge priority value of bridge FDRY2 210 is changed from 100 to 3000, then port 2 (211) should assume the role of root port in the steady state (since bridge FDRY1 205 will assume the role of root bridge) and port 4 (261) should assume the role of a blocked port. Port 6 (260) should be in a forwarding state, while port 8 (214) should be in a blocked port. An embodiment of the invention advantageously provides a method to prevent a port in a loopback connection (such as port 8 (214) on bridge FDRY2 210) to assume the role of root port, as described below.

In an embodiment of the invention, a method for computation of a root port will exclude all self loop ports in the root port computation. Thus, this exclusion of a self loop port in the root port computation advantageously avoids in changing the role of a blocked port into a root port. In the example of FIG. 3, the port 8 (214) and port 6 (260) in the loopback connection 230 are excluded from the root port computation.

Figure 4:
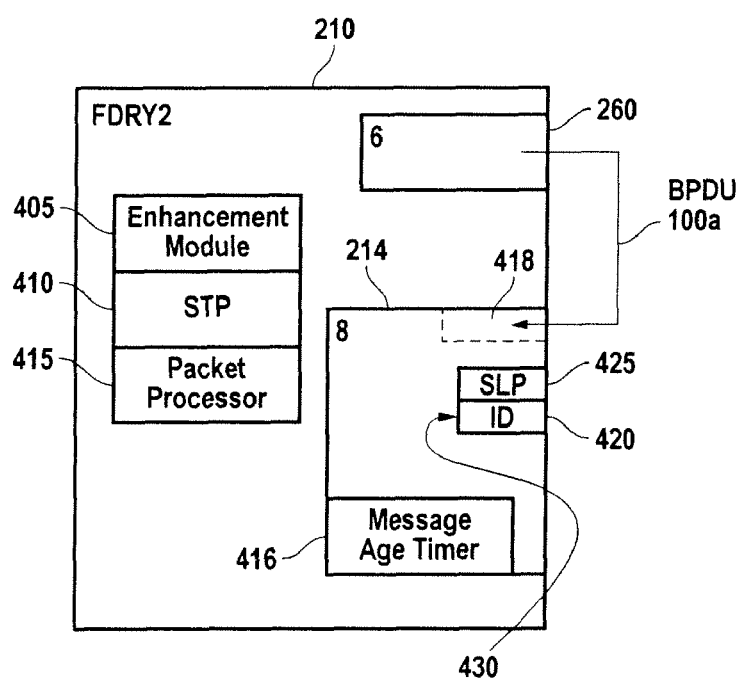
FIG. 4 is a block diagram that illustrates additional components in a bridge, in accordance with an embodiment of the invention.

FIG. 4 is also a block diagram that illustrates additional components in the bridge FDRY2 210, such as the enhancement module 405, STP module 410, and packet processor 415, in accordance with an embodiment of the invention. It is noted that an enhancement module 405, STP module 410, and packet processor 415, and/or other components are also implemented in the other bridges in an embodiment of the network system 100. The enhancement module 405 performs processing functions as described herein, in accordance with embodiments of the invention. The STP module 410 performs processing functions of the STP protocol. The packet processor module 415 performs processing functions for packets that are received and/or transmitted by the bridge FDRY2 210.

The bridge FDRY2 210 (as well as other bridges in the system 200) also includes a message age timer 416 which is a timer for its non-designated ports. The bridge FDRY2 210 (as well as other bridges in the system 200) further includes the message age timer 416 to track the maximum period of time that is timed out when determining if a root port is able to listen for BPDUs from the root bridge.

The port 8 (214) receives BPDUs 100a in a virtual pipe 418. To identify ports in a loopback connection, the receiving port 8 (214) checks the TRANSMITTING_BRIDGE_ID parameter (field 115 in FIG. 1) of a BPDU message 100a that is received by the port 8 (214) from the port 6 (260). The enhancement module 405 performs this checking function. If the TRANSMITTING_BRIDGE_ID parameter corresponds to the BRIDGE_ID (bridge identifier) 420 of the receiving port 8 (214), then the receiving port 8 (214) is categorized as a "self loop port" (i.e., the receiving port is in a loopback connection). If the enhancement module 405 categorizes the receiving port 8 (214) as a self loop port, then the enhancement module 405 will set a flag SLP 425 in the port 8 (214). The bridge ID 420 and flag SLP 425 are typically stored in a memory 430 in the port 8 (214). The enhancement module 405 will set a flag SLP 425 in other ports that is detected as a self loop port.

Since the flag SLP 425 has been set in the port 8 (214), the STP module 410 will exclude the port 8 (214) in the root port computation.

It is noted that the various codes or modules in FIG. 4 are shown as separate blocks for purposes of explaining the functionalities of embodiments of the invention. However, it is within the scope of embodiments of the invention to integrate the various modules into various configurations. For example, the enhancement module is typically integrated with the STP module.

Enhancement 2

The STP standard treats all ports alike. In other words, the STP standard does not distinguish ports that are connected to bridges and ports that are connected to processors. As mentioned above, two time expiry events are required to occur before a port will go into a forwarding state.

An embodiment of the invention permits a port to go into a forwarding state much faster than the two time expiry events delay, if the port is connected to a computer or workstation and is not connected to an 802.1D compatible switch.

Fast-span ports are ports in a bridge, which connects to workstations or computers. Fast-span ports do not register any incoming BPDU activity on them. Also the role of a fast-span port will remain as a designated port as long as the fast-span port does not register an incoming BPDU activity.

Figure 5:
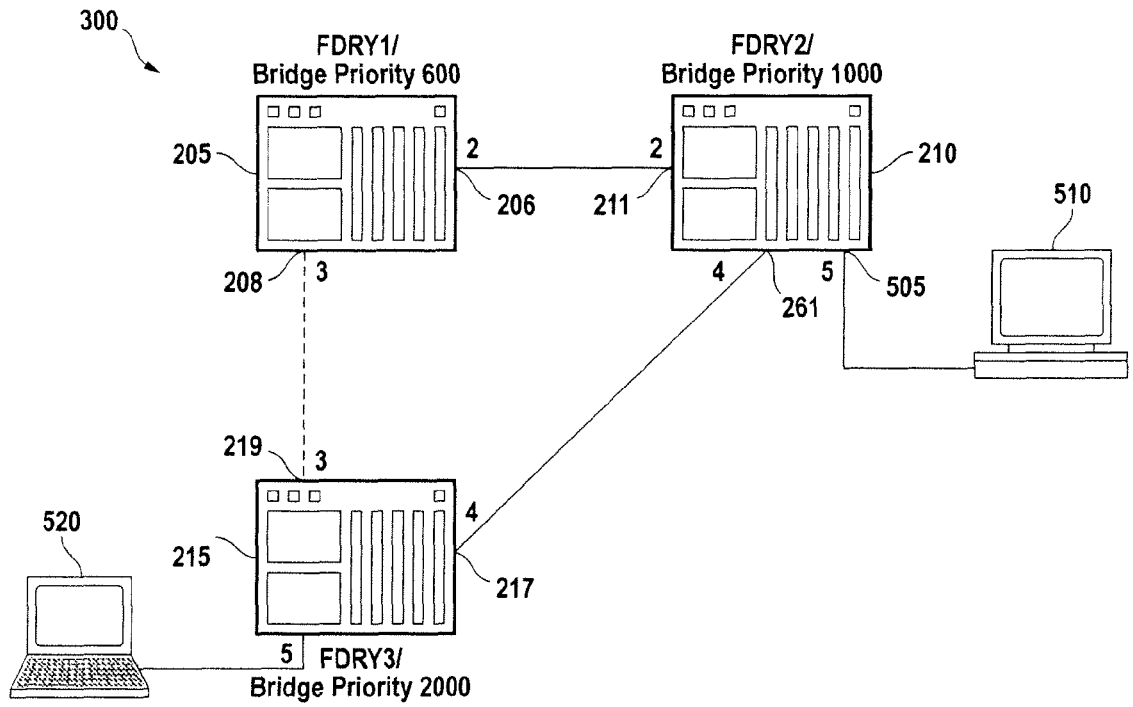
FIG. 5 is a block diagram of a network system where various bridges are connected to a workstation or computer, in accordance with an embodiment of the invention.

In the network system 500 in FIG. 5, port 5 (505) of bridge FDRY2 210 is connected to a workstation 510, such as a SUN SPARC workstation. Port 5 (515) of bridge FDRY3 215 is connected to a computer 520, such as a laptop computer. Therefore, the port 5 (505) and port 5 (515) are fast-span ports. Other types of computing devices that do not send BPDUs may be used instead of the workstation 510 and/or computer 520 to connect to the fast-span ports.

An embodiment of the invention provides a method where, if a port is configured as an fast-span port, then the port goes to forwarding state rapidly (e.g., in less than approximately 4 seconds) when the STP module 410 (FIG. 6) initializes the port. If, however, an incoming BPDU is received from a previously configured Fast-span port, then the STP module 410 automatically makes this port as non-Fast-span port. It is typically extremely important to make the Fast-span port into to a non-Fast-span port when a BPDU is received, in order to ensure a loop free Layer 2 operation.

The fast span feature will be enabled by default on all the bridge ports and the fast span feature will be disabled as the port learns of multiple MAC addresses from a MAC client or registers incoming BPDU activity on the port.

Figure 6:
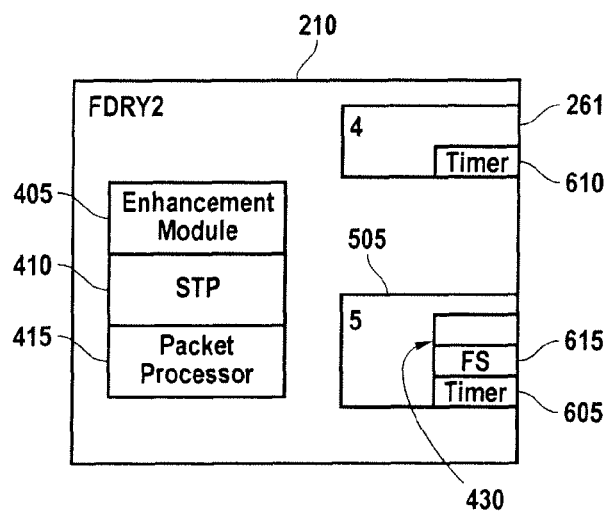
FIG. 6 is a block diagram that illustrates additional components in a bridge to describe a method of rapidly placing a fast-span port into forwarding state, in accordance with an embodiment of the invention.

In an embodiment of the invention, if fast span is enabled on a port, then an embodiment of the invention dynamically shortens the value of the forward delay timer on the port, and the port goes to forwarding state on this short timer. In the example of FIG. 6, when fast span is enabled on the port 5 (505), then the enhancement module 405 dynamically shortens the value of the forward delay timer 605 on the port 5 (505), and the port 5 (505) goes into forwarding state on this short timer value of timer 605.

The rest of the ports (e.g., port 4), which have fast span disabled, will go to a forwarding state, only after two instances of expiration of the default value of a forward delay timer (e.g., timer 610).

The fast span feature on the port 5 (505) is enabled by a "fast span" flag 615 which is set by the enhancement module 405. The fast span flag 615 is typically stored in the memory 430 in port 5 (505).

Enhancement 3

In classical STP, the worst-case convergence, could be 2*FORWARD_DELAY+BRIDGE_MAX_AGE. The default value for FORWARD_DELAY is typically about 15 seconds, BRIDGE_MAX_AGE (also referred herein as "bridge max age") is a maximum period of time that is timed out when determining if a root port is able to listen for BPDUs from the root bridge. When a new root port is selected after the message age timer expiry, the newly selected root port goes through LISTENING and LEARNING stages before the port is put to FORWARDING state. This is the expected behavior of the STP Std.

Figure 7A:
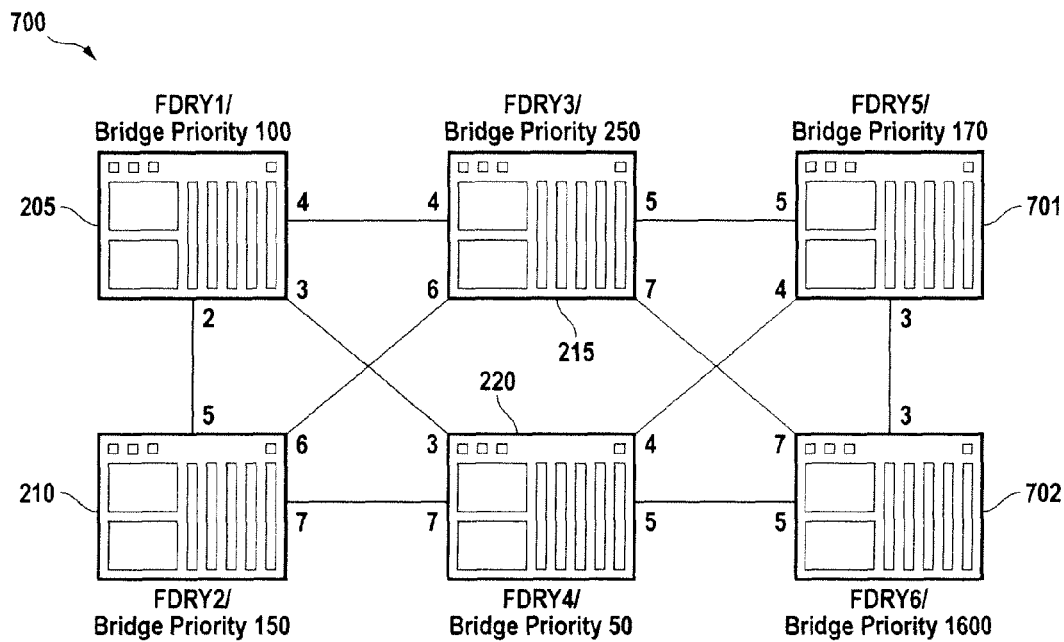
FIG. 7A is a block diagram of a network system, where the root bridge has a priority value of 50.

It is noted that STP does not converge for nearly approximately 2 minutes associated with a complex topology change. For the illustration of the problem to be solved during dynamic configuration, consider the STP topology of network system 700 as shown in FIG. 7A. The system 700 includes the following bridges: FDRY1 205, FDRY2 210, FDRY3 215, FDRY4 220, FY5 701, and FY6 702.

Figure 7B:
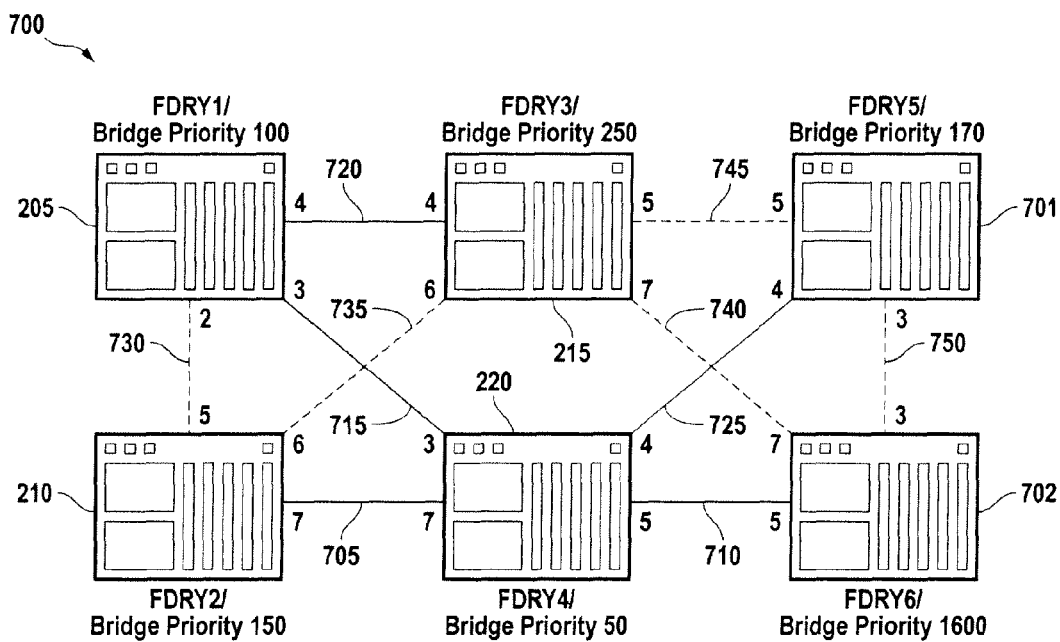
FIG. 7b is a block diagram of the network system of FIG. 7A after STP convergence has occurred.

In this topology of system 700, bridge FDRY4 220 is the root bridge of the topology and traffic will converge as shown in FIG. 7B. In this topology of FIG. 7B, solid lines (e.g., lines 705-725) indicate the active layer 2 (L2) paths and the dotted lines (e.g., lines 730-745) indicate redundant paths. STP has traffic has fully converged as indicated in FIG. 7B.

Figure 7C:
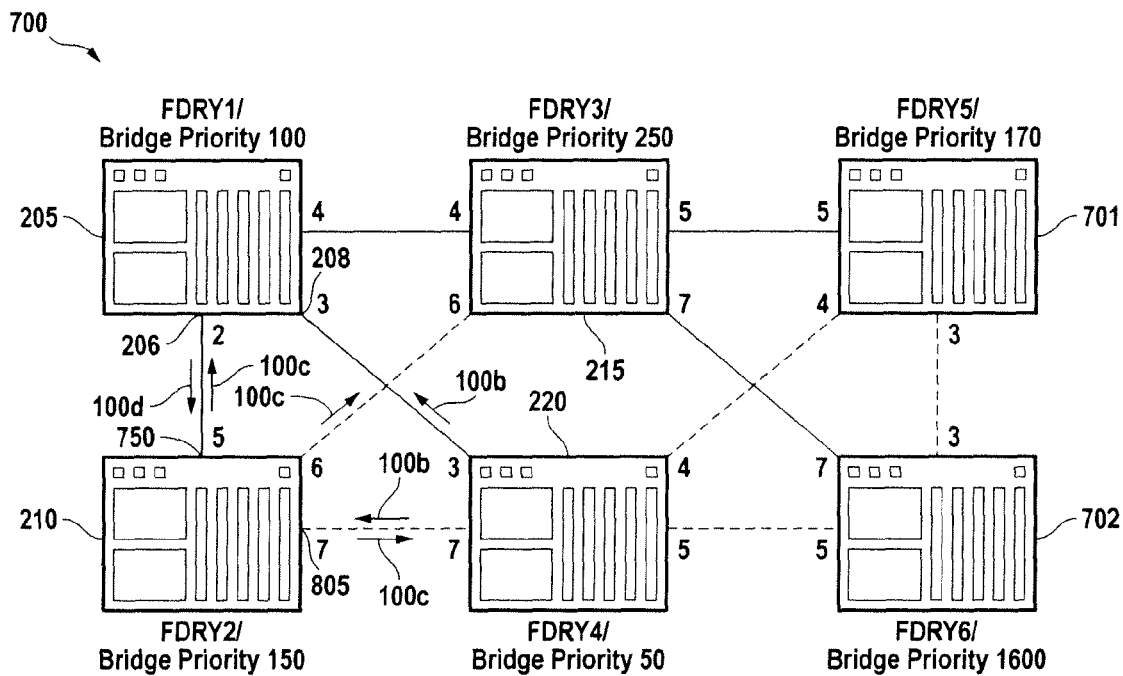
FIG. 7C is a block diagram of a network system, where a root bridge has a priority value is changed.

An example is now provided to describe a problem that is solved by an operation of an embodiment of the invention. Now consider at this point, by administrative action, the bridge priority of the operational root bridge FDRY4 220 was changed from a value=50 to a value=400. This change in the bridge priority is a valid topology change event, and the STP should converge as indicated in FIG. 7C, with bridge FDRY1 205 as the new root bridge, since bridge FDRY1 205 has the next best bridge priority with a value=100.

The STP standard mandates that re-convergence happens in less than approximately 50 seconds. However, due to reasons described below, the STP re-convergence in FIG. 7C takes much more than approximately 50 seconds.

Bridge FDRY4 220 keeps sending (on all its ports) BPDUs with the following message components:
{400: MAC_FDRY4, 0, 400: MAC_FDRY4, Port_priority: PORT_NUMBER}

The following actions occur on bridge FDRY2 210.
(a) Bridge FDRY2 210 receives BPDUs 100b (see FIG. 7C) from bridge FDRY4 220. Bridge FDRY2 210 does not reply to these BPDU messages 100b since the port (i.e., port 7 (805)) on which the BPDU messages 100b are received is not a designated port. Port 7 (805) is not a designated port since port 7 (805) can not send the best (most useful) BPDU on the segment 705 to which it is connected, and a BPDU reply is only sent from a designated port.
(b) On transmission on 2/2, if the hold timer 802 is active and configuration pending is TRUE.
(c) Assuming default values, at 20 seconds later, the message age timer will expire in the root port of bridge FDRY2 210. As mentioned above, a message age timer is timer on a NON-designated port.
(d) Now bridge FDRY2 210 assumes a role of a root bridge and transmits (on all its ports) BPDUs 100c with the following message information:
{150: MAC_FDRY4, 0, 150: MAC_FDRY4, Port_priority: PORT_NUMBER}.

The following actions occur on bridge actions on bridge FDRY1 205.

Assuming that the message age timer did not expire on bridge FDRY1 205, the bridge FDRY1 205 replies (on all its designated ports) with the vector:
{50: MAC_FDRY4, 0, 100: MAC_FDRY1, Port_priority: PORT_NUMBER}.

These replies are shown as BPDUs 100d on FIG. 7C. These BPDUs 100d, when received by bridge FDRY2 210, qualifies to be SUPERIOR messages (more useful BPDUs than the BPDUs that are sent by FDRY2 210) and a new root port is selected, and bridge FDRY2 210 stops having the role of the root bridge. The BPDU 100d qualifies to be a SUPERIOR message because the BPDU 100d includes the previous bridge priority value of value=50 of bridge FDRY4 220. Therefore, bridge FDRY1 205 is replying on behalf of a bridge FDRY4 220 with a bridge priority value of value=50 which no longer exists in the system 100 after the administrative action was performed. Accordingly, since BPDU 100d qualifies as a superior message, a new root port is accordingly selected on bridge FDRY2 210.

Therefore, in this example to illustrate a problem to be solved, the message age timer on bridge FDRY2 210 had expired before the message age timer on bridge FDRY1 205. Therefore, bridge FDRY2 210 advertised itself as the root bridge by sending the BPDUs 100c. Since the message age timer in bridge FDRY1 205 has not expired, it replies to the BPDUs 100c from bridge FDRY2 210 with the BPDUs 100d which includes information indicating that the root bridge is bridge FDRY4 220 with bridge priority of value=50 (as previously shown in FIGS. 7A and 7B).

Now the root port on bridge FDRY2 210 has to expire its timer for traffic convergence. Effectively, the root port which was about to expire has made the malfunction in the system by replying with a BPDU, corresponding to a root bridge which does not exist in the given topology. So the STP convergence takes much longer than the time that the standard expects convergence to occur.

As illustrated above, the problem is caused by a designated port, when the designated port tries to reply to an inferior (less useful) BPDU when the information currently held by the root port is about to be aged out. This problem could be avoided if the message age timer on bridge FDRY1 205 had expired before the message age timer on bridge FDRY2 210. If the message age timer on bridge FDRY1 205 had expired first, then bridge FDRY1 205 will reply to the bridge FDRY2 210 with the BPDUs 100d that includes the priority value of 100 for bridge FDRY1 205. A BPDU 100d with the bridge priority information of value=100 will be superior to a BPDU 100c with the bridge priority information of value=150 for bridge FDRY2 210. However, it is not possible to guarantee that the message age timer on bridge FDRY1 205 will expire before the message age timer on bridge FDRY2 210. For example, the processor on bridge FDRY2 210 might be faster than the processor on bridge FDRY1 205. As another example, the processor on bridge FDRY1 205 may be in a state where the processor is not able to process packet traffic for a time period.

Figure 8:
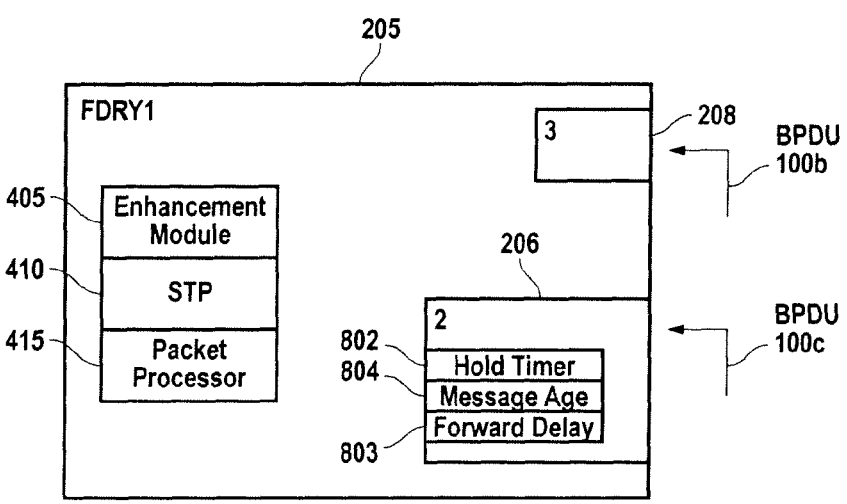
FIG. 8 is a block diagram that illustrates additional components in a bridge to describe a method of minimizing the delay in convergence time for a complex topology change in the network system, in accordance with an embodiment of the invention.

Reference is now made to the block diagram of FIG. 8k which illustrates the bridge FDRY1 205 for purposes of discussing an embodiment of the invention. The default value for bridge max age (as set by the message age timer 416) is approximately 20 seconds and the default value of the hello time is approximately 2 seconds. A hello timer 801 (FIG. 8) can be used to indicate the hello time expiry event. The message age timer 804, hold timer 802, and forward delay timer 803 are per-port timers (i.e., timers in every port). The max-age value is used to initialize the message age timer 804 correctly.

An embodiment of the invention provides a solution to the above-mention problem by providing a method where an operational designated port does not reply to an inferior message if the age of the message currently held by the root port is approximately half of the bridge max age plus the hello time. This time value is defined as the "limiting message age" time value and is expressed in equation (1).

Limiting message age=(bridge max age)/2+(hello time)            Equation (1)

Assuming default values are used in Equation (1), the value can be computed for the limiting message age will be approximately 12 seconds. This is fairly a large value, since the 802.1D standard mandates that BPDU messages are to be transmitted by all operational designated port once in every hello time.

FIG. 8 is a block diagram of the bridge FDRY1 205 to illustrate a method minimizing the delay in convergence time for a complex topology change in the network system 700. Assume that root port 3 (208) in bridge FDRY1 205 previously received the BPDU 100b from the root bridge FDRY4 220 (with bridge priority at value=50). Assume that the bridge priority of bridge FDRY4 220 is now change to value=400, as noted above. At this point, the bridge FDRY1 205 still has the no-longer-valid information that the root bridge is bridge FDRY4 220 (with bridge priority at value=50).

When the port 2 (206) in bridge FDRY1 205 receives the BPDU 100c from bridge FDRY2 210 and the message age timer has less than 12 seconds remaining before expiry (i.e., less than the limiting message age time value of Equation (1)), then the enhancement module 405 will prevent the port 2 (206) from sending the reply message (BPDU 100d) to the port 5 (750) in bridge FDRY2 210. For example, the message age timer expiry is at approximately 2 seconds when the port 2 (206) in bridge FDRY1 205 receives the BPDU 100c from bridge FDRY2 210. As a result, port 2 (206) will not send the reply message BPDU 100d, and the port 5 (750) does not receive the BPDU 100d with the former bridge priority value of 50 for bridge FDRY4 220.

The enhancement module 405 blocks the BPDU response messages from the ports (e.g., port 2 (206)), if the port receives a BPDU and the message age timer has less than the limiting message age value of Equation (1).

The various engines discussed herein may be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or actions will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters or components shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A computer implemented method comprising:
examining, by a first network device configured to perform packet switching, a first data message at a root port of the first network device that includes identification of a current root network device and a priority value of the current root network device;
after the examining of the first data message, examining, by the first network device, a second data message at a second port of the first network device that includes identification of a second network device; and after the examining of the second data message, if a message age timer of the first network device has less than a limiting message age time value remaining before expiry, then blocking a reply, by the second port of the first network device, to the second data message from the second network device.

2. The method of claim 1, wherein the first data message is a bridge protocol data unit (BPDU).

3. The method of claim 1, wherein the first network device becomes a root network device after the priority value of the current root network device is changed.

4. The method of claim 1, wherein the first data message is a bridge protocol data unit (BPDU); and the first network device becomes a root network device after the priority value of the current root network device is changed.

5. The method of claim 1 wherein the first network device is configured to maintain the message timer for only non-designated ports of the first network device.

6. The method of claim 5 wherein the message age timer is configured to track a maximum period of time that is timed out when determining if a root port is able to listen for data messages from the current root network device, the data messages including an identification of the current root network device and a priority value of the current root network device.

7. The method of claim 1 wherein the blocking a reply comprises preventing the first network device from sending the reply to the second network device.

8. The method of claim 7 wherein the first network device and the second network device are configured in accordance with a loop avoidance protocol.

9. The method of claim 8 wherein the loop avoidance protocol comprises a Spanning-Tree Protocol (STP).

10. The method of claim 9 wherein the STP comprises the IEEE 802.1D standard.

11. The method of claim 1 wherein the first network device comprises a first bridge; and the second network device comprises a second bridge.

12. An apparatus comprising:
a plurality of ports; and
one or more engines configured to:
examine a first data message at a root port of the apparatus that includes identification of a current root network device and a priority value of the current root network device;
after the examination of the first data message, examining a second data message at a second port of the apparatus that includes identification of a second network device; and
after the examination of the second data message, if a message age timer of the apparatus has less than a limiting message age time value remaining before expiry, then blocking a reply, by the second port of the apparatus, to the second data message from the second network device.

13. The apparatus of claim 12, wherein the first data message is a bridge protocol data unit (BPDU).

14. The apparatus of claim 12, wherein the apparatus is further configured to become a root network device after the priority value of the current root network device is changed.

15. The apparatus of claim 12, wherein the first data message is a bridge protocol data unit (BPDU); and the apparatus is further configured to become a root network device after the priority value of the current root network device is changed.

16. The apparatus of claim 12 wherein the apparatus is configured to maintain the message timer for only non-designated ports of the apparatus.

17. The apparatus of claim 16 wherein the message age timer is configured to track a maximum period of time that is timed out when determining if a root port is able to listen for data messages from the current root network device, the data messages including an identification of the current root network device and a priority value of the current root network device.

18. The apparatus of claim 12 wherein the one or more engines are further configured to, when blocking the reply, prevent the apparatus from sending the reply to the second network device.

19. The apparatus of claim 18 wherein the apparatus and the second network device are configured in accordance with a loop avoidance protocol.

20. The apparatus of claim 19 wherein the loop avoidance protocol comprises a Spanning-Tree Protocol (STP).

21. The apparatus of claim 20 wherein the STP comprises the IEEE 802.1D standard.

22. The apparatus of claim 12 wherein
the apparatus comprises a first bridge; and
the second network device comprises a second bridge.

23. A machine-readable non-transitory medium having a program of instructions stored thereon that are executable by a machine to perform a method, the method comprising:
examining, by a first network device configured to perform packet switching, a first data message at a root port of the first network device that includes identification of a current root network device and a priority value of the current root network device;
after the examining of the first data message, examining, by the first network device, a second data message at a second port of the first network device that includes identification of a second network device; and
after the examining of the second data message, if a message age timer of the first network device has less than a limiting message age time value remaining before expiry, then blocking a reply, by the second port of the first network device, to the second data message from the second network device.

24. An apparatus comprising:
means for examining, by a first network device configured to perform packet switching, a first data message at a root port of the first network device that includes identification of a current root network device and a priority value of the current root network device;
means for, after the examining of the first data message, examining, by the first network device, a second data message at a second port of the first network device that includes identification of a second network device; and
means for, after the examining of the second data message, if a message age timer of the first network device has less than a limiting message age time value remaining before expiry, then blocking a reply, by the second port of the first network device, to the second data message from the second network device.

* * * * *